(12) United States Patent
Haba et al.

(10) Patent No.: US 6,237,956 B1
(45) Date of Patent: May 29, 2001

(54) STEERING COLUMN SUPPORT BRACKET

(75) Inventors: Charles A. Haba, Royal Oak; Dennis L. Henderson, Ann Arbor; Robert L. McHugh, Rochester Hills; Paul G. Truman, Macomb, all of MI (US)

(73) Assignees: Lear Corporation, Southfield; General Motors Corporation, Detroit, both of MI (US)

(*) Notice: Subject to any disclaimer, the term of this patent is extended or adjusted under 35 U.S.C. 154(b) by 0 days.

(21) Appl. No.: 09/550,423

(22) Filed: Apr. 17, 2000

(51) Int. Cl.$^7$ ............................................. B62D 1/16
(52) U.S. Cl. .................... 280/779; 280/777; 180/90; 296/192; 296/194
(58) Field of Search .................. 280/779, 777; 180/90, 89.1; 296/194, 192, 72

(56) References Cited

U.S. PATENT DOCUMENTS

| | | |
|---|---|---|
| 4,274,646 | 6/1981 | Olligschlager . |
| 4,365,826 | 12/1982 | Iriyama . |
| 4,597,461 | 7/1986 | Kochy et al. . |
| 4,733,739 | 3/1988 | Lorenz et al. . |
| 4,738,469 | 4/1988 | Ushijima et al. . |
| 5,005,898 | 4/1991 | Benedetto et al. . |
| 5,082,078 * | 1/1992 | Umeda et al. ............................ 180/90 |
| 5,088,571 | 2/1992 | Burry et al. . |
| 5,090,730 * | 2/1992 | DuRocher et al. .................. 280/775 |
| 5,120,106 | 6/1992 | Sakurai et al. . |
| 5,180,189 * | 1/1993 | Moreno ................................. 280/779 |
| 5,181,435 * | 1/1993 | Khalifa et al. .......................... 74/492 |
| 5,238,286 * | 8/1993 | Tanaka et al. ........................... 296/70 |
| 5,259,646 | 11/1993 | Snyder . |
| 5,280,956 * | 1/1994 | Tanaka et al. ......................... 280/777 |
| 5,311,960 * | 5/1994 | Kukainis et al. ....................... 180/90 |
| 5,312,133 * | 5/1994 | Pietila et al. .......................... 280/752 |
| 5,358,300 * | 10/1994 | Gray ....................................... 296/192 |
| 5,364,159 * | 11/1994 | Kelman et al. ....................... 296/192 |
| 5,387,023 * | 2/1995 | Deneau ................................... 296/72 |
| 5,564,515 * | 10/1996 | Schambre ................................ 180/90 |
| 5,564,769 * | 10/1996 | Deneau et al. .......................... 296/72 |
| 5,584,509 | 12/1996 | Tekelly et al. . |
| 5,676,216 | 10/1997 | Palma et al. . |
| 5,690,363 | 11/1997 | Rybinski . |
| 5,819,592 | 10/1998 | Lewandowski et al. . |
| 5,868,426 | 2/1999 | Edwards et al. . |
| 5,992,925 | 11/1999 | Alberici . |
| 6,027,088 | 2/2000 | Stedman et al. . |
| 6,047,987 * | 4/2000 | Cart ....................................... 280/775 |
| 6,073,987 * | 6/2000 | Lindberg et al. ....................... 296/70 |
| 6,099,038 * | 8/2000 | Jurik et al. ............................ 280/777 |
| 6,152,489 * | 11/2000 | Hedderly et al. ..................... 280/779 |

\* cited by examiner

*Primary Examiner*—Brian L. Johnson
*Assistant Examiner*—Deanna Draper
(74) *Attorney, Agent, or Firm*—Brooks & Kushman P.C.

(57) ABSTRACT

A steering column support bracket for a vehicle that is attached to HVAC ducts extending transversely across the vehicle that are located between the dashboard and the front of dashboard cowl. The steering column support bracket is attached to the hinge pillar, the front of dashboard cowl and is connected by a brace to the compartment pan of the vehicle. Several embodiments of steering column support brackets are disclosed that are designed to engage the HVAC ducts. The steering column support bracket may be formed as a C-shaped structure, an under duct configuration, or in a clam shell structure. In addition to supporting the steering column of the vehicle, the steering column support bracket may support brake switches, a power steering motor, and a cruise control system.

7 Claims, 5 Drawing Sheets

STEERING COLUMN SUPPORT BRACKET

TECHNICAL FIELD

The present invention relates to a steering column support bracket for a vehicle.

BACKGROUND ART

The dashboard portion of a vehicle is a complex multi-function assembly that presents considerable challenges for a vehicle design. Systems that are incorporated into the dashboard include the instrument panel, heating ventilation and air conditioning (HVAC) ducts, stereo systems, power steering systems, cruise control systems, and vehicle system wiring. All of these systems and components must be housed within the dashboard behind the instrument panel in a compact and attractive package. To maximize vehicle interior space, the amount of space available to house all of the components and systems of a vehicle dashboard must be minimized.

Pressure to improve fuel economy translates into a need to reduce the weight of vehicles. The dashboard of a vehicle is one of the areas that can be focused on for weight savings and could ultimately lead to improved fuel economy. Conventional dashboards have included a steel cross-car support that extends transversely across the car. It has been proposed to eliminate the steel cross-car support and provide instead structural HVAC ducts that support and reinforce the car body. One problem presented by this approach is that it is necessary to support the steering column that may weigh as much as 30 lbs. Another problem is the need to limit vibration frequencies in the column to 35 hertz. Steering columns must also be designed to meet FMVSS 201 and FMVSS 208 standards as well as OBD and DSI requirements.

Generally, the space enclosed by the dashboard between the instrument panel and the front of the dashboard cowl is relatively limited especially in view of the large number of vehicle components and systems that are housed within the dashboard. HVAC ducts, instrument panel wiring harnesses, audio systems, air bag systems, break pedal sleds, brake switches, power steering components, cruise control and other systems are preferably housed within the dashboard. In addition, a tilt steering wheel necessitates accommodating a steering column tilt joint and clearance for adjustment of the steering column tilt angle. All of these components must be securely retained within the dashboard so that parts do not vibrate or rattle beneath the dashboard.

One problem encountered by the prior art is the amount of clearance required for brake pedals, brake pedal sleds and brake switches. Automotive manufacturers require a "big foot" zone around the brake pedal that assures the ample clearance regardless of the size of a driver's foot. When brake switches are provided on the brake sled a large hole is required in the sound dampening panel or "hush panel" that can adversely affect the effectiveness of the sound dampening panel.

Finally, it is important that any vehicle system or sub-system such as a steering column support bracket be easily manufactured and assembled during the vehicle assembly process. Access must be provided for welding components together or securing components with fasteners. It is also important to save tooling expense and reduce operation cycle times to keep costs to a minimum while meeting all applicable standards and requirements.

The above problems and challenges are addressed by the Applicant's invention as summarized below.

DISCLOSURE OF INVENTION

The present invention relates to a steering column support bracket for a vehicle. The vehicle has a steering column, a dashboard, a cowl located in front of the dashboard, and HVAC ducts extending transversely across the vehicle between the dashboard and the cowl. The steering column support bracket is attached to the cowl, a hinge pillar; and a compartment pan of the vehicle. The steering column support bracket is preferably formed as an integral body comprising a bottom wall, a rear wall contiguous with and extending upwardly from the bottom wall, and a top wall that is contiguous with and extends forward to the rear wall. The bottom wall, rear wall, and top wall are assembled around the HVAC ducts. A hinge pillar bracket is formed on one lateral end of the steering column support bracket and is attached to the hinge pillar. A front of dashboard cowl bracket is formed on the forward edge of the top wall that is adapted to be attached to the cowl. A brace is connected to the other lateral end (relative to the lateral end on which the hinge pillar bracket is formed) of the steering column support bracket and to the compartment pan of the vehicle.

Several alternative embodiments are disclosed of the steering column support bracket for a vehicle having components as described above that cooperate with the steering column support bracket. One alternative embodiment, includes a bottom wall and a front wall that extends upwardly from the bottom wall to the front of dashboard cowl. The bottom wall and front wall are assembled to multi-part HVAC ducts after they are fully assembled and is connected to the hinge pillar, front of dashboard cowl, and brace as described.

According to another alternative embodiment the invention, a steering column support bracket is provided for a vehicle having the same components described above that function with the steering column support bracket. Another alternative embodiment includes a lower clam shell panel and an upper clam shell panel that are assembled around the HVAC ducts. The steering column support bracket is connected to the hinge pillar, the dashboard cowl and brace as previously described.

According to other aspects of the present invention, the steering column support bracket is adapted to have the brake pedal and brake switches attached thereto as well as other components such as the power steering motor and cruise control module. In the clam shell embodiment, the upper and lower clam shell panels are secured together by fasteners. The clam shell panels may also be provided with interlocking elements in addition to fasteners to allow interlocking connection of the upper and lower clam shell panels on one edge while other portions of the clam shell panels are secured together by fasteners.

BEST MODE FOR CARRYING OUT THE INVENTION

Figure 1:
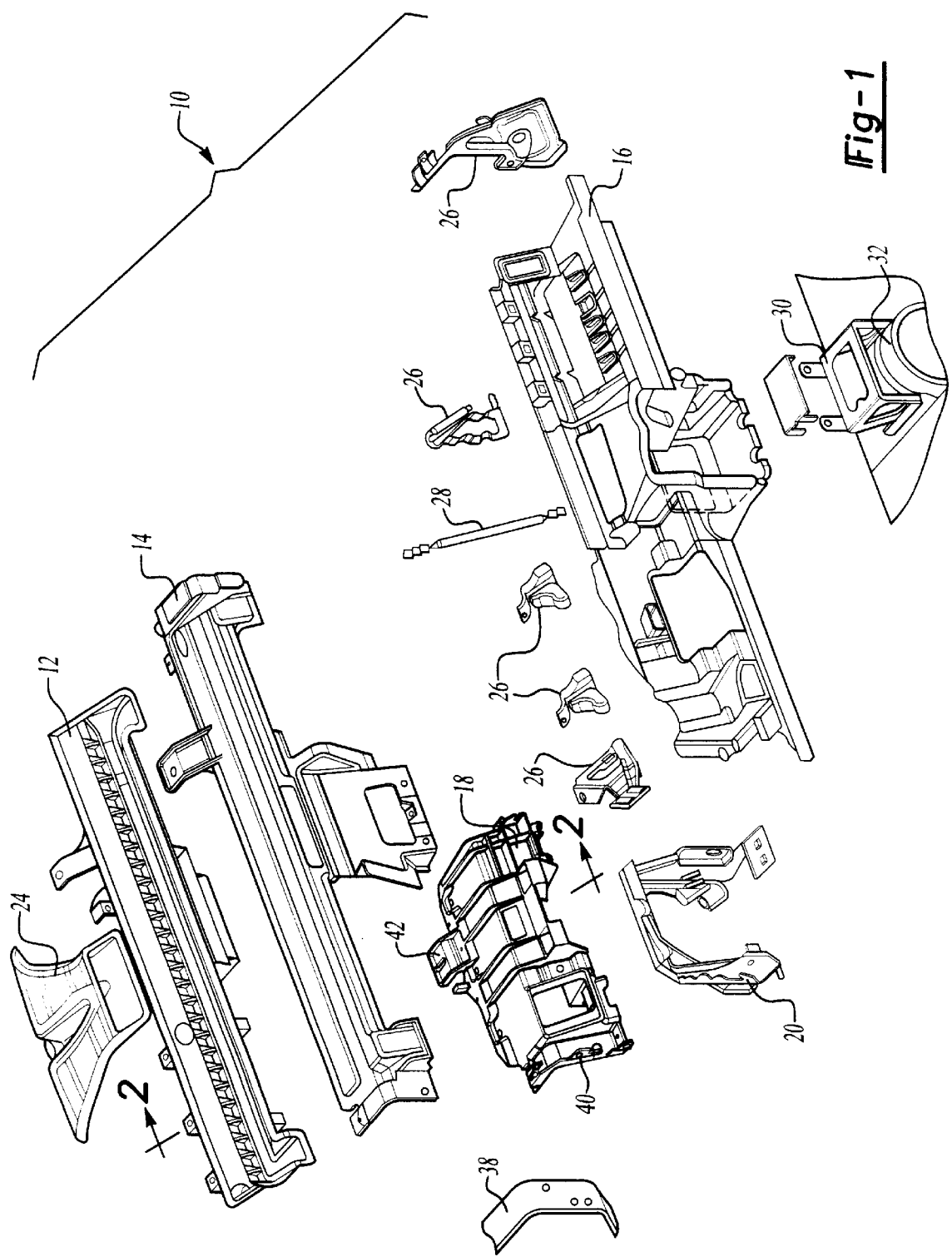
FIG. 1 is an exploded perspective view of a vehicle dashboard including the steering column support bracket made according to one embodiment of the present invention.

Referring now to FIG. 1, a molded plastic cross-car beam 10 is shown to be comprised of a first panel 12, a second panel 14, and a third panel 16. The cross-car beam 10 defines heating, ventilation and air conditioning (HVAC) ducting within the dashboard of a vehicle. The cross-car beam 10 is a structural plastic member formed by a series of layers to provide a cross-car beam that can replace a steel cross-car beam that was formerly provided as part of the dashboard of a vehicle.

One embodiment of a steering column support bracket 18 is shown in FIG. 1. The first panel 12 and second panel 14 are assembled together prior to assembly of the steering column support bracket 18. The steering column support bracket 18 has a generally C-shaped configuration and is received around three sides of the assembled first and second panels 12, 14. A brake sled 20 is adapted to be assembled to the steering column support bracket 18 either before or after assembly of the third panel 16 over the steering column support bracket 18.

As shown in FIG. 1, a defroster duct 24 is ported to the first panel 12 for directing heated air from the HVAC ducts to impinge upon the windshield (not shown). A plurality of knee crush brackets 26 are provided to support the lower portion of the third panel 16. A pencil brace 28 is provided to connect the steering column support bracket 18 to the tunnel bracket 30 or tunnel 32 of the vehicle compartment pan 34.

Figure 2:
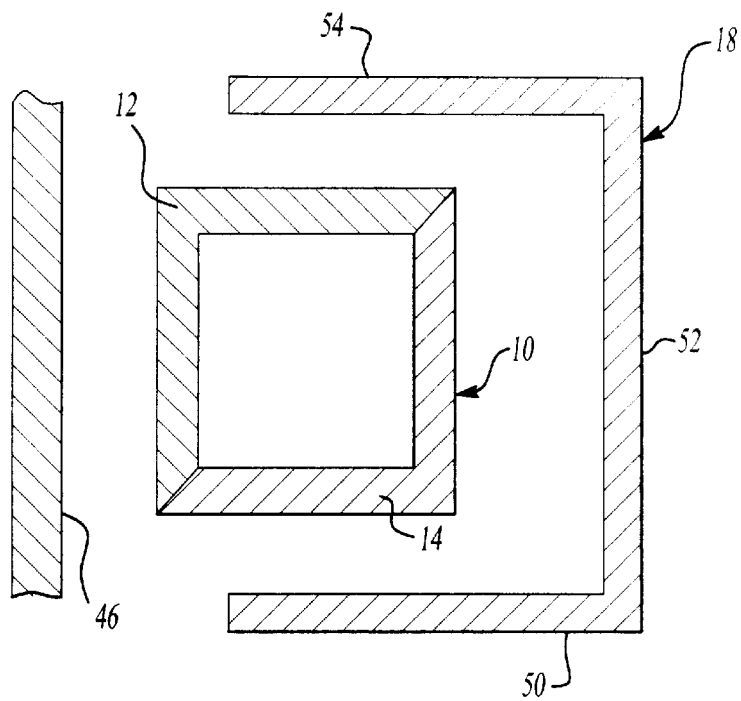
FIG. 2 is a schematic view of one embodiment of the steering column support bracket of the present invention.

A hinge pillar 38 of a vehicle is partially shown in FIG. 1. A hinge pillar bracket 40 is formed on one end of the steering column support bracket 18 and is fastened to the hinge pillar 38. A cowl bracket 42 extends forwardly from the steering column support bracket 18 and is adapted to be secured to the front of dash cowl 46, as shown in FIG. 2. The front of dash cowl 46 corresponds to what was formerly referred to as the firewall of the vehicle. The steering column support bracket 18 is supported by means of the pencil brace 28, hinge pillar bracket 40, and cowl bracket 42 in such a way that it minimizes vibration and provides a durable high-strength support for the steering column of the vehicle.

Referring now to FIG. 2, the construction of the steering column support bracket 18 is shown and its relationship to the first and second panels 12, 14 of the cross-car beam 10 and the front of dash cowl 46 is illustrated schematically. The steering column support bracket 18 includes a bottom wall 50, a rear wall 52, and a top wall 54. Note, as used herein, the terms "front" and "rear" refer to the directions corresponding to the front and rear of the vehicle. The bottom wall 50, rear wall 52, and top wall 54 partially encircle the first and second panels 12, 14. The steering column support bracket 18 is preferably formed as a molded magnesium part for high strength and ridigity. However, it is possible that the steering column support bracket 18 could be formed of a fiber-reinforced molded plastic material.

Figure 3:
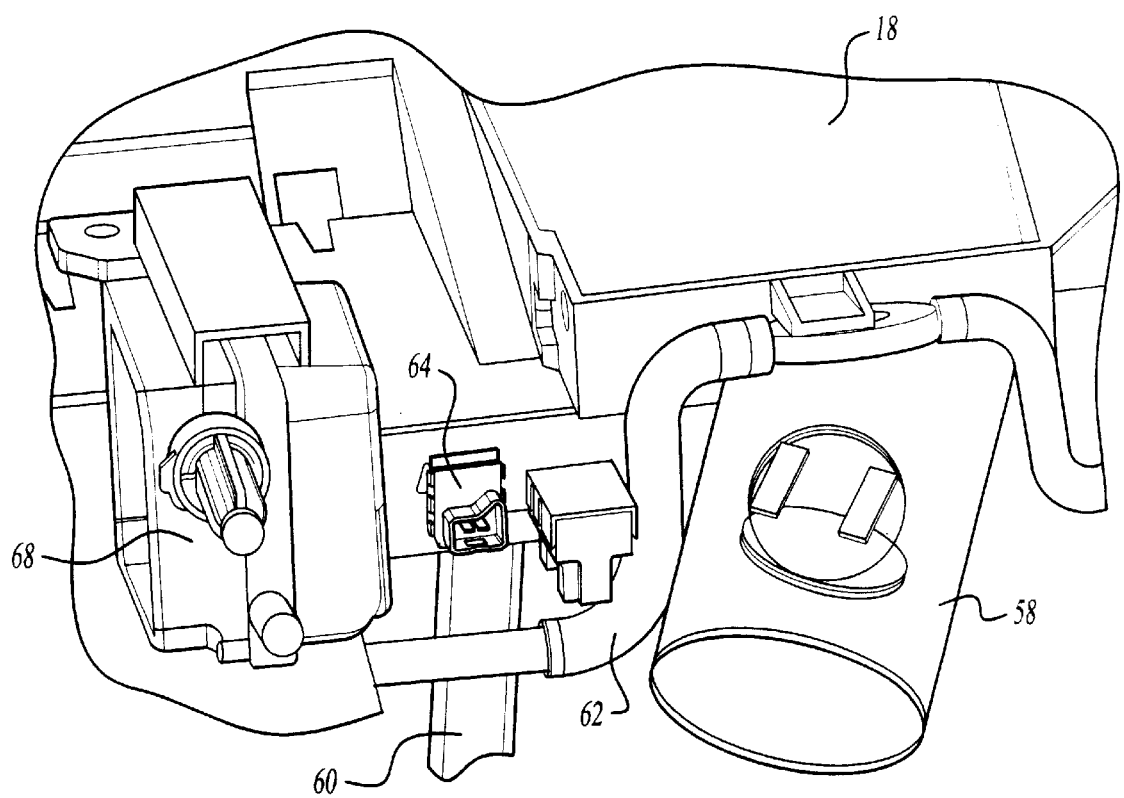
FIG. 3 is a fragmentary front perspective view of a steering column support bracket having a brake pedal and brake switch made in accordance with the present invention.

Referring now to FIG. 3, the steering column support bracket 18 is shown from the point of view of the front of dash cowl 46, that is, from the front of the vehicle looking rearwardly from inside the dashboard. A steering column 58 is partially shown. A brake pedal 60 is pivotably secured to the brake pedal pivot arm 62. Brake switches 64 are provided adjacent to the top of the pedal 60 so that when the pedal 60 pivots on the brake pedal pivot arm 62, the brake switch 64 may be actuated. A cruise control module 68 is shown to be secured to the lower portion of the steering column support bracket 18. In addition, an electronic power steering motor (not shown) could also be secured to the steering column 58. It will be readily appreciated that the addition of the cruise control module 68 and electronic power steering motor in addition to the steering column substantially increases the weight that must be supported by the steering column support bracket 18. Since these relatively heavy modules and components are supported by the steering column support bracket 18, less weight must be carried by the cross-car beam 10. By locating the brake pedal switches on the steering column support bracket 18 adjacent the top of the pedal 60, it is possible to eliminate some of the material of the brake pedal sled of the prior art. This should result in additional weight reduction.

Figure 4:
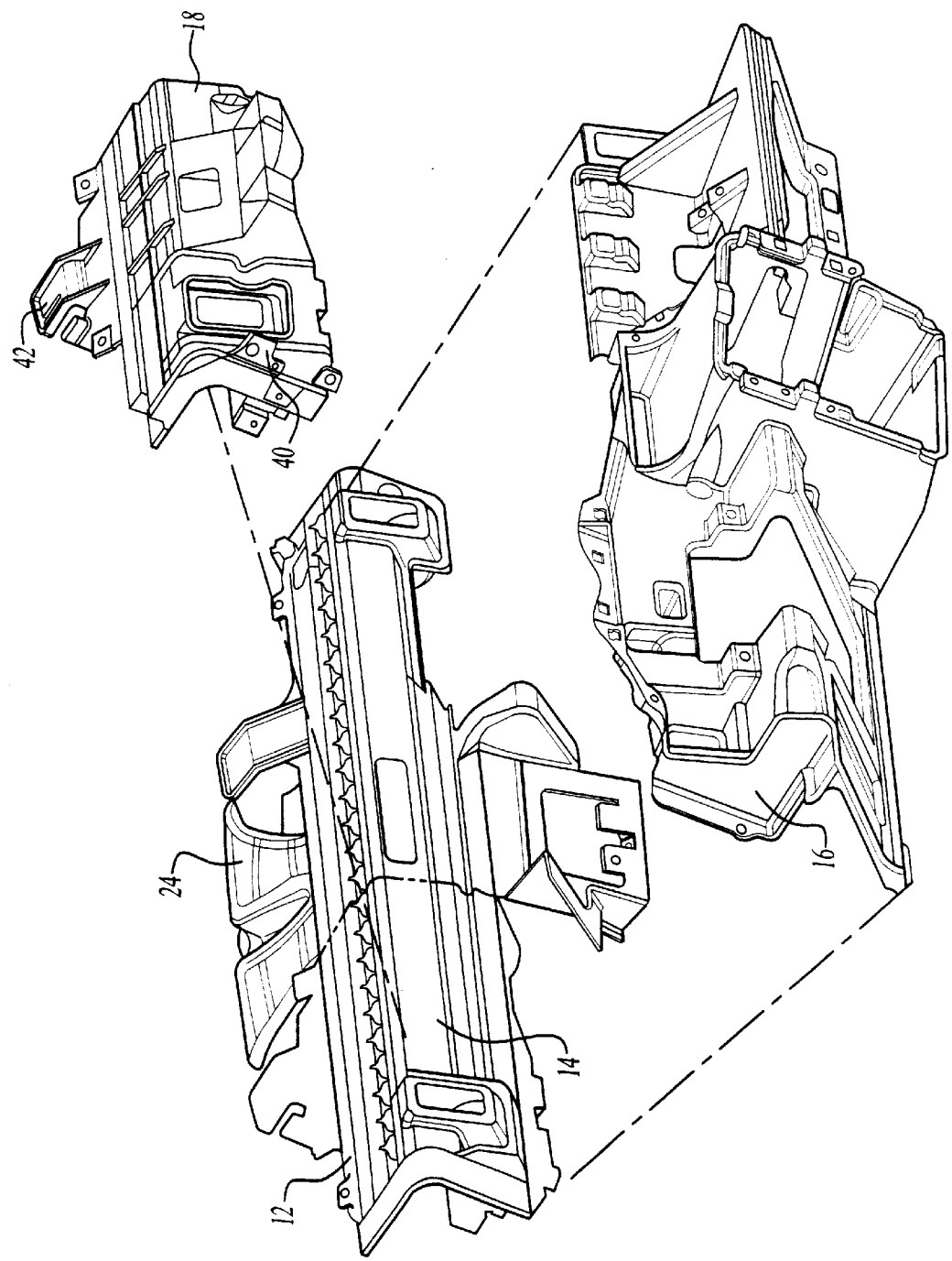
FIG. 4 is an exploded perspective view of part of a dashboard assembly including the steering column support bracket in accordance with one embodiment of the present invention.

Referring now to FIG. 4, assembly of the steering column support bracket 18 is illustrated wherein the first panel 12 and second panel 14 are initially assembled together to form part of the cross-car beam 10. The steering column support bracket 18 is then assembled to the first and second panels 12, 14 with the hinge pillar bracket 40 and cowl bracket 42 extending beyond the cross-car beam 10 to be secured to the hinge pillar 38 and front of dash cowl 46, respectively. The third panel 16 is then assembled over the steering column support bracket 18 and the first and second panels 12, 14.

Figure 5:
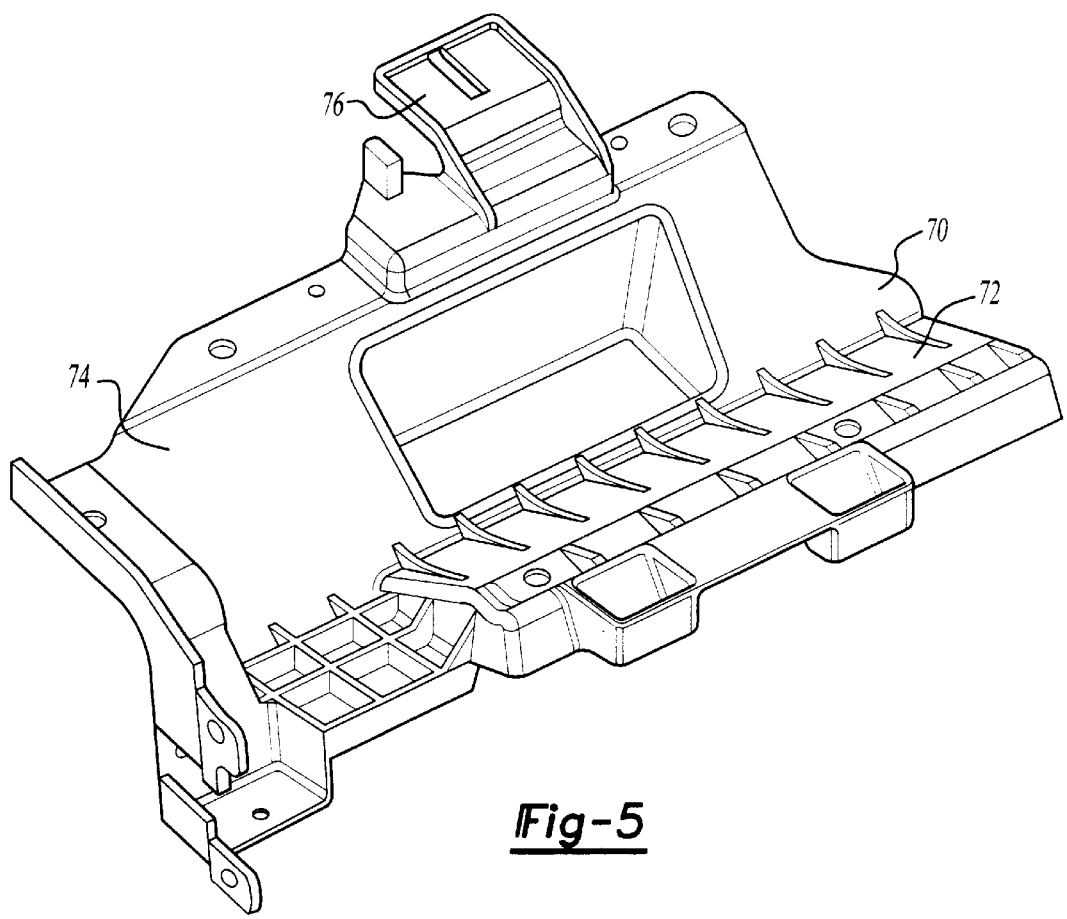
FIG. 5 is a perspective view of an under duct mount alternative steering column support bracket.

Referring now to FIG. 5, an alternative embodiment of the present invention is shown that is referred to as the under duct mount steering column support bracket 70. The under duct mount steering column support bracket 70 includes a bottom wall 72 and a forward wall 74. A cowl bracket 76 extends forwardly of the forward wall 74 for attachment to the front of dash cowl 46.

Figure 6:
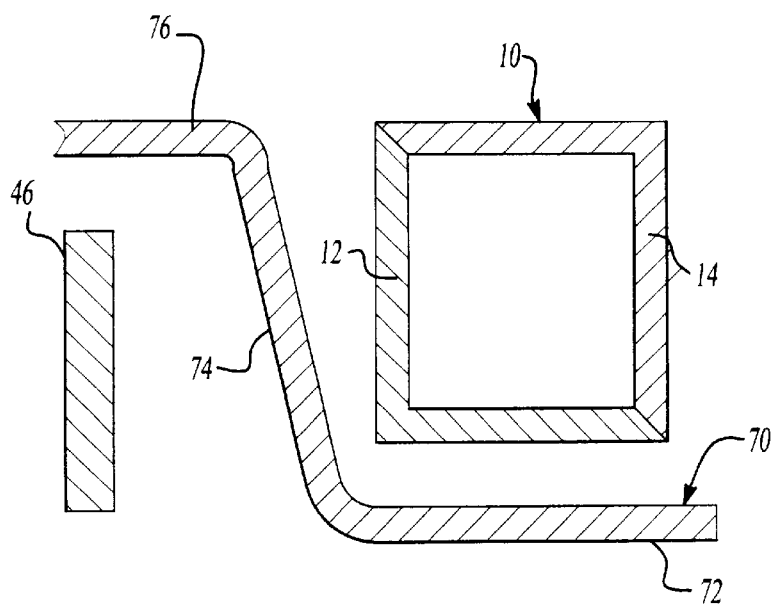
FIG. 6 is a schematic view showing the under duct mount alternative steering column support bracket.

Referring to FIG. 6, the arrangement of the under duct mount alternative is shown wherein the cross-car beam 10 including the first, second, and third panels 12, 14, and 16 are initially secured together. The under duct mount steering column support bracket 70 may then be assembled to the cross-car beam 10 from below and secured to the front of dash cowl 46 by means of the cowl bracket 76. An advantage of this alternative is that the cross-car beam 10 may be fully assembled and welded together as a unitary piece before the steering column support bracket 70 is assembled as part of the dashboard to the front of dash cowl 46. The under duct mount steering column support bracket 70 is preferably formed of molded magnesium but may also be manufactured from other structural fiber reinforced plastic materials as discussed above with reference to the steering column support bracket 18. Alternatively, this embodiment could be formed of sheet molding compound (SMC), if desired.

Figure 7:
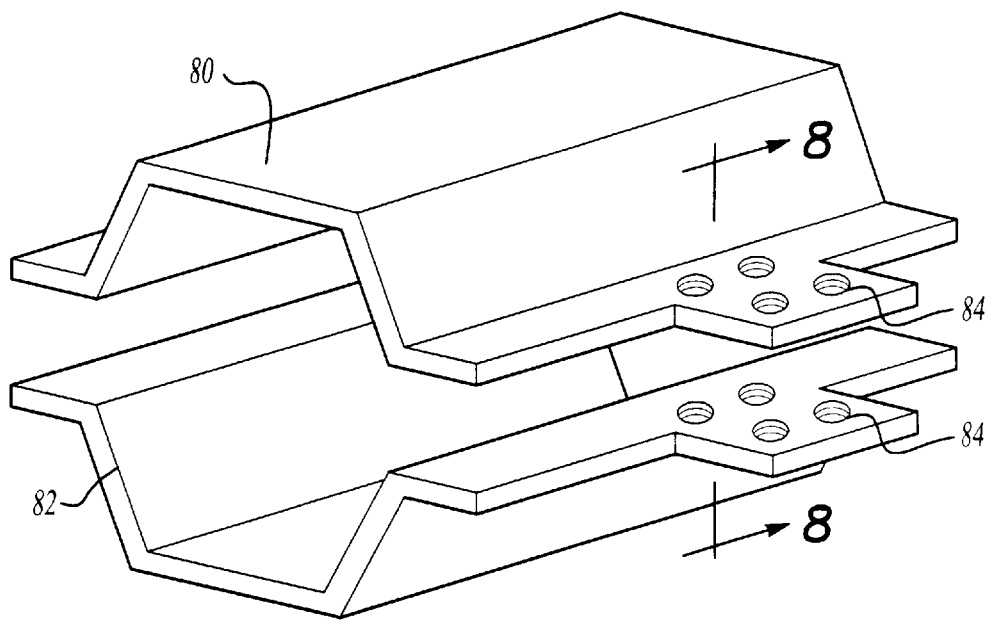
FIG. 7 is a schematic exploded perspective view of a clam shell alternative embodiment of the steering column bracket.
Figure 8:
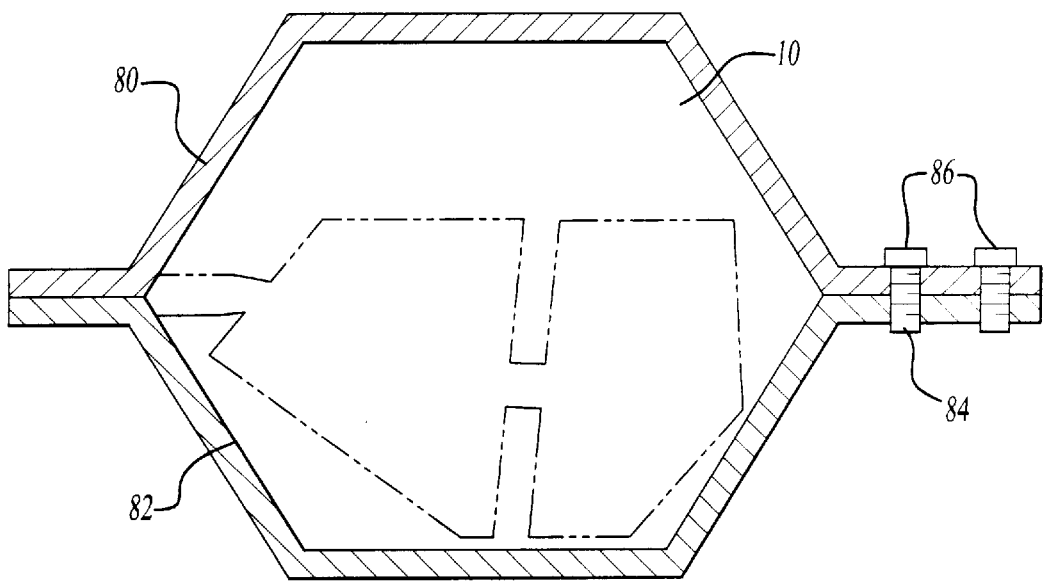
FIG. 8 is a cross-sectional view of a clam shell alternative embodiment of the steering column bracket.

Referring now to FIGS. 7 and 8, another embodiment of the present invention referred to as the clam shell embodiment is shown schematically. An upper clam shell 80 and lower clam shell 82 each include threaded openings 84 in which bolts 86 are received to secure the upper and lower clam shells 80, 82 together. While the threaded openings 84 and bolts 86 are shown on only one flange of the upper and lower clam shell 80, 82, other fasteners could be used to secure the panels together or an interlocking flange could be used to hold one or more flanges of the upper clam shell 80 and lower clam shell 82 together. When assembled as shown in FIG. 8, the cross-car beam 10 is received within the opening defined by the upper clam shell 80 and lower clam shell 82. The clam shell could be manufactured from polypropylene reinforced with fiberglass or another appropriate structural polymer material.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A steering column support bracket for a vehicle having a steering column, a dashboard, a cowl located in front of the dashboard, HVAC ducts extending transversely across the vehicle located between the dashboard and the cowl, a hinge pillar to which the hinges of the front door of the vehicle are attached, and a compartment pan, the steering column support bracket being formed as an integral body, comprising:
   a bottom wall;
   a rear wall contiguous with and extending upwardly from the bottom wall;
   a top wall contiguous with and extending forward of the rear wall, wherein the bottom wall, rear wall and top wall are assembled around the HVAC ducts;
   a hinge pillar bracket formed on one lateral end of the steering column support bracket that is adapted to be attached to the hinge pillar;
   a front of dashboard cowl bracket formed on the forward edge of the top wall that is adapted to be attached to the cowl; and
   a brace connected to the other lateral end of the steering column support bracket relative to the one end on which the hinge pillar bracket is formed, the brace being connected to the compartment pan of the vehicle.

2. The steering column support of claim 1 wherein brake switches are attached to the steering column support.

3. The steering column support of claim 1 wherein a cruise control system is attached to the steering column support.

4. The steering column support of claim 1 wherein brake switches are attached to the steering column support, and wherein a cruise control system is attached to the steering column support.

5. A steering column support bracket for a vehicle having a steering column, a dashboard, a cowl located in front of the dashboard, HVAC ducts extending transversely across the vehicle located between the dashboard and the cowl, a hinge pillar to which the hinges of the front door of the vehicle are attached, and a compartment pan, the steering column support bracket being formed as an integral body and comprising:
   a bottom wall;
   a front wall contiguous with and extending upwardly from the bottom wall, wherein the bottom wall and front wall are assembled to the bottom and front portions of the HVAC ducts;
   a hinge pillar bracket formed on one lateral end of the steering column support bracket that is adapted to be attached to the hinge pillar;
   a front dashboard cowl bracket formed on the forward edge of the top wall that is adapted to be attached to the cowl; and
   a brace connected to the other lateral end of the steering column support bracket relative to the one end on which the hinge pillar bracket is formed, the brace being connected to the compartment pan of the vehicle.

6. A steering column support bracket for a vehicle having a steering column, a dashboard, a cowl located in front of the dashboard, a windshield located above the dashboard and cowl, HVAC ducts extending transversely across the vehicle located between the dashboard and the cowl, a hinge pillar to which the hinges of the front door of the vehicle are attached, and a compartment pan, the steering column support bracket comprising:
   a lower clam shell panel;
   an upper clam shell panel;
   the upper and lower clam shell panels being assembled around the HVAC ducts;
   a hinge pillar bracket formed on one lateral end of the steering column support bracket that is adapted to be attached to the hinge pillar;
   a front dashboard cowl bracket formed on the forward edge of the top wall that is adapted to be attached to the cowl; and
   a brace connected to the other lateral end of the steering column support bracket relative to the one end on which the hinge pillar bracket is formed, the brace being connected to the compartment pan of the vehicle.

7. The steering column support bracket of claim 6 wherein the upper and lower clam shell panels each have fastener receptacles formed therein and wherein fasteners secure the upper and lower clam shell panels together around the HVAC ducts.

* * * * *